(12) United States Patent
Willis (10) Patent No.: US 9,846,426 B2
(45) Date of Patent: Dec. 19, 2017

(54) PARALLEL DIGITAL SIGNAL PROCESSING OF MACHINE VIBRATION DATA

(71) Applicant: Computational Systems, Inc., Knoxville, TN (US)

(72) Inventor: John W. Willis, Oak Ridge, TN (US)

(73) Assignee: Computational Systems, Inc., Knoxville, TN (US)

(*) Notice: Subject to any disclaimer, the term of this patent is extended or adjusted under 35 U.S.C. 154(b) by 355 days.

(21) Appl. No.: 14/807,202

(22) Filed: Jul. 23, 2015

(65) Prior Publication Data

US 2016/0025599 A1     Jan. 28, 2016

Related U.S. Application Data

(60) Provisional application No. 62/029,606, filed on Jul. 28, 2014.

(51) Int. Cl.
    *H03F 1/26*     (2006.01)
    *G05B 19/4065*     (2006.01)
    *G01M 7/00*     (2006.01)

(52) U.S. Cl.
    CPC .......... *G05B 19/4065* (2013.01); *G01M 7/00* (2013.01); *G05B 2219/33273* (2013.01); *G05B 2219/37252* (2013.01); *G05B 2219/37434* (2013.01); *G05B 2219/37435* (2013.01)

(58) Field of Classification Search
None
See application file for complete search history.

*Primary Examiner* — Cory Eskridge
(74) *Attorney, Agent, or Firm* — Luedeka Neely Group, P.C.

(57) ABSTRACT

A field programmable gate array (FPGA) in a machine health monitoring (MHM) module includes interface circuitry, vibration data processing circuitry, and tachometer data processing circuitry. The interface circuitry de-multiplexes a synchronous serial data stream comprising multiple multiplexed data channels, each containing machine vibration data or tachometer data, into separate input data streams. The vibration data processing circuitry comprises parallel processing channels for the separate input data streams containing vibration data, each channel including a highpass filter, two stages of integration circuits, a digital tracking bandpass filter, and multiple parallel scalar calculation channels. The tachometer data processing circuitry processes the tachometer data to generate RPM and other values. A cross-point switch in the FPGA distributes tachometer signals between MHM modules in a distributed control system, thereby allowing multiple modules to share tachometer information.

26 Claims, 6 Drawing Sheets

PARALLEL DIGITAL SIGNAL PROCESSING OF MACHINE VIBRATION DATA

RELATED APPLICATIONS

This application claims priority to co-pending provisional patent application Ser. No. 62/029,606, filed Jul. 28, 2014, titled "Methods and Apparatus for Integral Vibration Input and Output Card with Process Control System."

FIELD

This invention relates to the field of machine vibration data processing. More particularly, this invention relates to a system for processing multiple parallel channels of machine vibration data, such as using a Field Programmable Gate Array (FPGA).

BACKGROUND

A traditional machine vibration analysis channel typically includes an analog front-end, an analog-to-digital converter (ADC), and a digital signal processor (DSP) or microcontroller. The analog front-end usually consists of a vibration sensor, an input amplifier, an AC coupling amplifier, an analog integrator, a variable-gain amplifier, a low-pass anti-aliasing filter, and a high-pass filter. Such implementations of front-end signal conditioning functions in the analog domain cause numerous problems. Calibration is required due to component variations that cause the sensitivity and bandwidth of the signal path to vary. Analog components require relatively large amounts of space on a printed circuit board, and they consume large amounts of power for low-noise designs. They are also somewhat limited in terms of programmability. For systems designed for use in hazardous environments, reduced voltage and capacitor allowances force tradeoffs in noise and bandwidth in the analog signal path.

What is needed, therefore, is a machine vibration measurement system in which the front-end signal conditioning functions are performed in the digital domain, such as in a field programmable gate array (FPGA).

SUMMARY

In one aspect, the invention is directed to an FPGA for processing machine vibration data. In a preferred embodiment, the FPGA includes interface circuitry, tachometer data processing circuitry, and vibration data processing circuitry.

The interface circuitry of the FPGA is configured to receive a synchronous serial digital data stream that includes multiple multiplexed data channels. The multiplexed data channels contain machine vibration data derived from machine vibration and tachometer sensors. Tachometer data is also provided to the FPGA as pulse waveforms derived either from an internal analog triggering circuit or as an external pulse input. The interface circuitry is configured to de-multiplex the serial digital data stream into multiple separate input data streams corresponding to the multiplexed data channels.

The tachometer data processing circuitry is configured to receive the separate input data streams that contain tachometer data and to process the tachometer data to generate one or more values indicative of a rotational speed.

The vibration data processing circuitry includes a number of parallel signal processing channels corresponding to the number of separate input data streams containing machine vibration data. The parallel signal processing channels include a high pass filter, a first integration circuit, a second integration circuit, a digital tracking bandpass filter, and multiple parallel calculation channels.

The high pass filter of each signal processing channel is configured to receive an input data stream containing machine vibration data and remove signal components having frequencies below a DC blocking threshold frequency, thereby generating a high pass filtered data stream.

The first integration circuit of each signal processing channel is configured to perform a first integration process on the input data stream or the high pass filtered data stream, thereby generating a first integrated data stream.

The second integration circuit of each signal processing channel is configured to perform a second integration process on the first integrated channel data stream, thereby generating a second integrated data stream.

The digital tracking bandpass filter of each parallel signal processing channel is configured to filter the input data stream, the first integrated data stream, or the second integrated data stream, thereby generating a bandpass filtered data stream. The center frequency of the digital tracking bandpass filter is determined based on the one or more values generated by the tachometer data processing circuitry that are indicative of rotational speed.

Each of the calculation channels include a data selection switch, a programmable lowpass filter, and a scalar value calculation circuit. The data selection switch selects between the bandpass filtered data stream, the high pass filtered data stream, the first integrated data stream, the second integrated data stream, or the input data stream. The programmable lowpass filter circuit receives the selected data stream from the data selection switch and generates a lowpass filtered data stream based on the selected data stream. The scalar value calculation circuit is configured to receive the lowpass filtered data stream and calculate a scalar data value based thereon.

In some preferred embodiments, the FPGA includes an integrator input selection switch for each channel configured to select between the input data stream and the high pass filtered data stream. In these embodiments, the first integration circuit is configured to integrate either the input data stream or the high pass filtered data stream based on the selection made by the integrator input selection switch.

In some preferred embodiments, the FPGA includes a tracking filter input selection switch for each channel configured to select between the input data stream, the first integrated data stream, and the second integrated data stream. In these embodiments, the digital tracking bandpass filter is configured to filter either the input data stream, the first integrated data stream, or the second integrated data stream based on the selection made by the tracking filter input selection switch.

In some preferred embodiments, the scalar value calculation circuits of the FPGA include an RMS scalar value calculation circuit, a peak scalar value calculation circuit, a peak-to-peak scalar value calculation circuit, an absolute +/− peak scalar value calculation circuit and a DC measurement circuit.

In some preferred embodiments of the FPGA, one or more of the parallel signal processing channels of the vibration data processing circuitry include a PeakVue processing channel. The PeakVue channel includes a full-wave rectifier circuit for receiving and full-wave-rectifying the input data stream, a peak hold circuit for generating a peak hold waveform comprising peak levels of the full-wave-rectified input data stream, and a PeakVue scalar calculation circuit for calculating a scalar value representing a peak value measured over a predetermined time or a predetermined number of data samples in the peak hold waveform.

In some preferred embodiments of the FPGA, one or more of the parallel signal processing channels of the vibration data processing circuitry include a prediction time waveform processing channel. The prediction time waveform processing channel includes a data selection switch for selecting between the high pass filtered data stream, the first integrated data stream, the second integrated data stream, the input data stream, and the filtered, full-wave-rectified (Peak-Vue) input data stream. A decimator circuit receives the selected data stream from the data selection switch and generates a decimated data stream based on the selected data stream. An up-sampling circuit is configured to up-sample the decimated data stream to generate an up-sampled data stream having a data rate that is greater than the data rate of the selected data stream.

In some preferred embodiments of the FPGA, one or more of the parallel signal processing channels of the vibration data processing circuitry include a protection time waveform processing channel. The protection time waveform processing channel includes a data selection switch for selecting between the high pass filtered data stream, the first integrated data stream, the second integrated data stream, the input data stream, and the filtered, full-wave-rectified (Peak-Vue) input data stream. A lowpass filter and decimator circuit receives the selected data stream from the data selection switch and generates a decimated data stream based on the selected data stream.

In some embodiments of the FPGA, the tachometer data processing circuitry includes a programmable trigger noise rejection circuit for reducing excessive jitter or noise in one or more of the separate input data streams that contain tachometer signal data.

In some embodiments of the FPGA, the tachometer data processing circuitry includes a divide-by-N circuit comprising a programmable pulse divider that divides pulse rates by an integer value N in one or more of the separate input data streams that contain tachometer data.

In some embodiments of the FPGA, the tachometer data processing circuitry includes an RPM indicator circuit that determines the RPM of a tachometer pulse stream in the tachometer data and generates an RPM scalar value based thereon.

In some embodiments of the FPGA, the tachometer data processing circuitry includes a zero-speed detection circuit that provides a zero-speed indication when the RPM is at or below a predetermined threshold for at least a predetermined interval.

In some embodiments of the FPGA, the tachometer data processing circuitry includes an over-speed detection circuit that provides an over-speed indication when the RPM is at or above a predetermined threshold for at least a predetermined interval.

In some embodiments of the FPGA, the digital tracking bandpass filter is configured to receive the RPM scalar value and determine the center frequency of the digital tracking bandpass filter based at least in part on the RPM scalar value.

In some embodiments of the FPGA, the tachometer data processing circuitry includes a rotation direction detection circuit that determines the direction of rotation of a machine component based on comparing phases of tachometer pulse signals in two of the separate input data streams that contain tachometer data.

In some embodiments, the separate input data streams that contain tachometer signal data include a first tachometer input signal data stream and a second tachometer input signal data stream. The tachometer data processing circuitry of these embodiments includes parallel first and second tachometer data processing channels. A cross-point switching circuit is configured to direct the first tachometer input signal data stream to either or both of the first and second tachometer data processing channels, and to direct the second tachometer input signal data stream to either or both of the first and second tachometer data processing channels.

In some embodiments of the FPGA, the cross-point switching circuit is further configured to direct either of the first and second tachometer input signal data streams to a first external tachometer signal output or to a second tachometer signal output.

In some embodiments, the cross-point switching circuit is further configured to direct a first external tachometer input signal or a second external tachometer input signal to either or both of the first and second tachometer data processing channels.

In some embodiments, the cross-point switching circuit is further configured to direct one or more external tachometer input signals to one or more external tachometer signal outputs.

In another aspect, the invention is directed to a machinery health monitoring module that processes machine vibration data and provides the machine vibration data to a distributed control system. In preferred embodiments, the machinery health monitoring module includes signal conditioning circuitry, processing circuitry, and a cross-point switching circuit.

The signal conditioning circuitry has an interface for receiving multiple analog vibration signals from multiple vibration sensors, and for receiving first and second analog tachometer signals from first and second tachometer sensors. The signal conditioning circuitry also includes amplification and filter circuitry for conditioning the analog vibration signals and the first and second analog tachometer signals, and ADC circuitry for converting the analog vibration signals and the first and second analog tachometer signals into digital vibration signals and first and second digital tachometer signals.

The processing circuitry includes multiple parallel vibration signal processing channels and first and second tachometer data processing channels. Each of the vibration signal processing channels are configured to process a corresponding one of the digital vibration signals to generate multiple scalar vibration values per channel and at least one vibration time waveform per channel. The first and second tachometer data processing channels are each configured to process the first and second digital tachometer signals to generate one or more values per channel that are indicative of rotational speed.

The cross-point switching circuit is configured to direct the first digital tachometer signal or the second digital tachometer signal to either or both of the first and second tachometer data processing channels.

In some embodiments, the cross-point switching circuit is further configured to direct either of the first and second digital tachometer signals to either or both of a first external tachometer signal output and a second external tachometer signal output.

In some embodiments, the cross-point switching circuit is further configured to direct first or second external tachometer input signals to either or both of the first and second tachometer data processing channels.

In some embodiments, the cross-point switching circuit is further configured to direct one or more external tachometer input signals to one or more external tachometer signal outputs.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Embodiments of the present invention provide a vibration data acquisition and analysis module that interfaces directly to a distributed control system I/O backplane to allow direct acquisition of vibration data by the DCS for purposes of machinery protection and predictive machinery health analysis. As the term is used herein, a "distributed control system (DCS)" is a type of automated control system used in a process or plant in which control elements are distributed throughout a machine or multiple machines to provide operational instructions to different parts of the machine(s). As the term is used herein, "protection" refers to using data collected from one or more sensors (vibration, temperature, pressure, etc.) to shut down a machine in situations in which severe and costly damage may occur if the machine is allowed to continue running "Prediction" on the other hand refers to using data collected from one or more vibration sensors, perhaps in combination with data from other types of sensors, to observe trends in machine performance and predict how much longer a machine can operate before it should be taken offline for maintenance or replacement.

Figure 1:
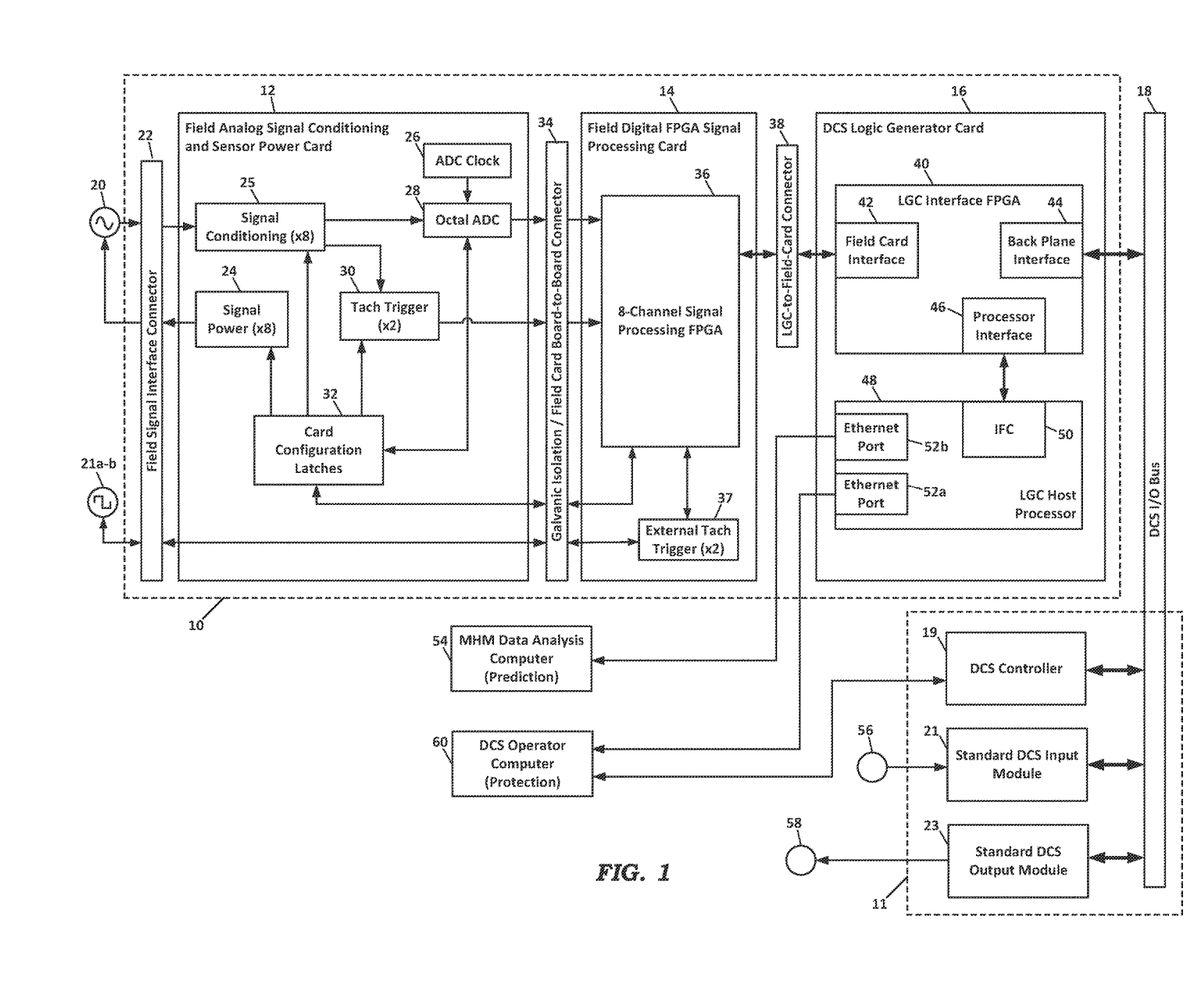
FIG. 1 depicts a machinery health monitoring (MHM) module interfaced with a distributed control system (DCS) according to an embodiment of the invention.

FIG. 1 depicts a machinery health monitoring module (MHM) 10 that directly interfaces with a DCS 11. In the preferred embodiment, the module 10 includes a field analog signal conditioning and sensor power card 12 that receives and conditions sensor signals, a field digital FPGA signal processing card 14 that processes the sensor signals, and a DCS logic generator card (LGC) 16 that provides an interface to a DCS I/O bus 18. The field card 12 can preferably accept input from up to eight measurement sensors 20 through a field signal interface connector 22. In a preferred embodiment, two of the sensor input channels may be configured as tachometer channels.

Preferably, galvanic electrical isolation is provided between the analog field card 12 and the digital field card 14. This electrical isolation prevents unintentional current flow, such as due to ground loops, between the mounting locations of the sensors 20 and the DCS 11.

Sensor power 24 and signal conditioning circuits 26 can support a wide range of sensors 20, including piezo accelerometers, piezo ICP velocity, piezo dynamic pressure, electro-dynamic velocity, eddy current displacement, AC vibration, and DC displacement. Tachometer sensors that are supported include eddy current displacement sensors, passive electro-magnetic sensors, Hall Effect tachometer sensors, N pulse/rev shaft encoders, and TTL pulse sensors. Many additional sensor types are supported over the frequency range of DC to 20 KHz as long as they fall within the following exemplary voltage input ranges: 0 to +24V, −24V to +24V, −12V to +12V, and 0 to −24V. In the preferred embodiment, up to eight sensor power circuits 24 can be individually programmed for a constant current of between 0 and 20 mA, which may also be used as lift current for an electro-dynamic (passive) velocity sensor. Constant voltage supplies (+24 VDC or −24 VDC) may also be selected for sensor power. The input voltage ranges listed above are also individually programmable on each sensor channel. This permits any mix of sensor power and input range configuration between the channels, thereby enabling a mix of supported sensors.

With timing provided by a clock 26, an 8-channel analog-to-digital converter (ADC) 28 converts the eight analog signals into a single serial data stream comprising eight simultaneously sampled interleaved channels of data. In some preferred embodiments, two tachometer triggering circuits 30 convert the two analog tachometer signals into tachometer pulses.

On the field card 14 is an 8-channel field programmable gate array (FPGA) 36 for processing the vibration data. The FPGA 36 receives the 8-channel digital waveform data and 2-channel tachometer data and processes the raw data in parallel to generate scalar overall vibration parameters and waveforms. The processed waveforms may include low-pass filtered, PeakVue™, order tracking, high-pass filtered (DC blocked), and selectable single-integrated (velocity), double-integrated (displacement), or non-integrated (acceleration) waveforms. Prediction data channels also preferably include an up-sampling data block to provide higher resolution data for Time Synchronous Averaging (TSA) or Order Tracking applications.

The vibration card configuration circuit 32 of the analog field card 12 preferably includes of a set of serial-to-parallel latch registers that accept a serial data stream of configuration data from the application firmware of the LGC 16. This data is loaded into a parallel-to-serial shift register in the interface of the FPGA 36. The FPGA 36 then handles shifting the serial data to the control latches using a synchronous SPI format.

During operation of the preferred embodiment, the MHM module 10 appears to the DCS controller 19 as a multichannel analog input card having scalar outputs similar to those of a standard DCS input module 21, such as may be outputting measured temperature, pressure, or valve position values. As discussed in more detail hereinafter, vibration signals are converted to scalar values by the module 10 and presented to the DCS controller 19 via the backplane of the DCS. One example of a DCS controller 19 is the Ovation™ controller manufactured by Emerson Process Management (a division of Emerson Electric Co.). In the typical DCS architecture, only sixteen scalar values are presented as high speed scan values to the DCS controller 19. In a high speed scan, the DCS controller 19 can read these sixteen scalar values at up to a 10 mS rate.

Time waveform block data (and some scalar values) may be transferred to the DCS controller 19 via the DCS I/O bus 18 using a block data transfer method, such as Remote Desktop Protocol (RDP), at a rate that is lower than the scan rate of the sixteen scalar values.

As the scalar values generated by the machinery health monitoring module 10 are read by the DCS controller 19, they are processed by software running in the DCS controller 19 in the same manner as any other DCS data. One primary function of the DCS controller 19 is to compare the scalar values with alarm limits. If the limits are exceeded, alarms are generated. Logic within the DCS controller 19 may also determine whether any actions should be taken based on alarm conditions, such as closing a relay. Operations including alarm relay logic, voting, and time delays are also performed in software by the DCS controller 19. Preferably, DCS control outputs, such as relay outputs and 4-20 mA proportional outputs, are driven by standard output modules 23 of the DCS. Bulk prediction data is formatted in the LGC host processor 48 and is transmitted via an Ethernet port 52a to a machine health management (MHM) analysis computer 54 for detailed analysis and display. Bulk protection data is also formatted in the LGC host processor 48, but is transmitted via a separate Ethernet port 52b to the DCS operator computer 60.

In preferred embodiments, a DCS operator computer 60 includes an interface for displaying vibration parameters and other machine operational data (pressures, temperatures, speeds, alarm conditions, etc.) that are output from the DCS controller 19.

Figure 2:
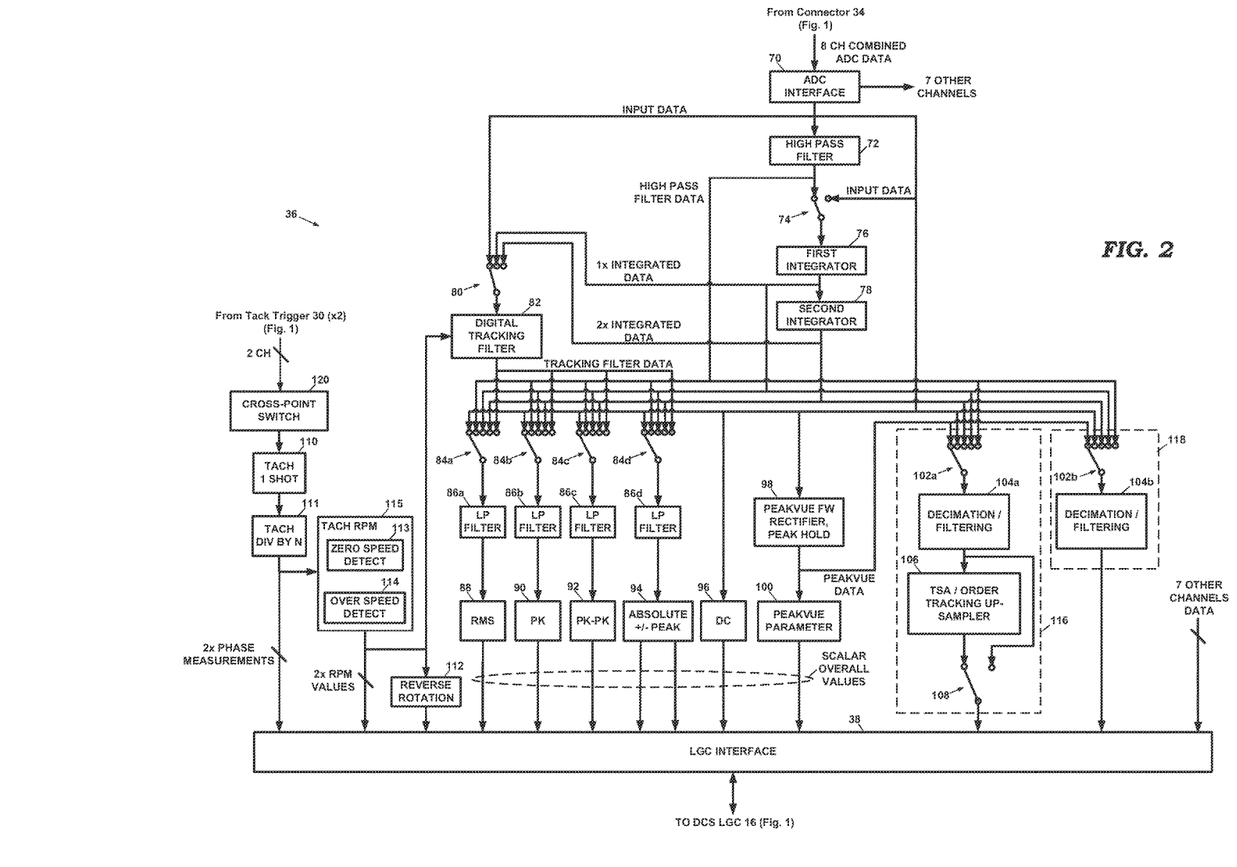
FIG. 2 depicts field digital FPGA signal processing circuitry according to an embodiment of the invention.

A functional block diagram of a single channel of the field digital FPGA 36 is depicted in FIG. 2. A preferred embodiment includes seven additional channels having the same layout as the one channel depicted in FIG. 2. As described in more detail hereinafter, the channel digital waveform data may be routed through a variety of digital filters and integration stages before being converted to vibration overall values or packaged as "bulk" time waveforms for further analysis by software running on the LGC card 16 or for transmission to DCS software or MHM software.

As shown in FIG. 2, an ADC interface 70 receives the eight channels of continuous, simultaneously sampled data from the ADC 28 of the field analog card 12 through the connector 34 (shown in FIG. 1). The data is preferably in the form of a multiplexed synchronous serial data stream in Serial Peripheral Interface (SPI) format. The ADC interface 70 de-multiplexes the data stream into eight separate channel data streams.

Although all eight channels could be used for vibration signal processing, in a preferred embodiment two of the eight channels may be used for tachometer measurement processing. Each tachometer measurement channel preferably includes:

a one-shot 110, which is a programmable trigger "blanking" function that provides noise rejection for tachometer pulse trains having excessive jitter or noise;

a divide-by-N 111, which is a programmable pulse divider that divides pulse rates of tachometer signals produced by gears or code wheels;

a reverse rotation detector 112 that determines the direction of shaft rotation by comparing the phase of two tachometer pulse signals;

an RPM indicator 115 that calculates the RPM of the tachometer pulse stream as a scalar overall value.

a zero-speed detector 113 that provides a "zero speed" indication when the tachometer has been inactive for a programmable interval, such as 0.1 s, 1 s, 10 s, or 100 s; and an over-speed detector 114 that provides an "over speed" indication when the tachometer exceeds a fixed 2 KHz or 62 KHz threshold. In alternative embodiments, this threshold may be programmable.

With continued reference to FIG. 2, each of the eight independent parallel channels of signal processing in the FPGA 36 preferably includes the following components:

a high pass filter 72 for DC blocking, which is preferably be set to 0.01 Hz, 0.1 Hz, 1 Hz, or 10 Hz, and which may be selected or bypassed for the integrators described below based on the position of a switch 74;

two stages of digital waveform integration, including a first integrator 76 and a second integrator 78, which provide for data unit conversion from acceleration to velocity, acceleration to displacement, or velocity to displacement;

a digital tracking bandpass filter 82 having a bandpass center frequency that is set by the tachometer frequency or multiples of the tachometer frequency, and that receives as input either the "input" data stream (no integration), the single integration data stream, or the double integration data stream based on the position of a switch 80, as described in more detail below; and scalar overall measurement calculation blocks 88-100 that determine several different waveform scalar overall values as described below.

In the preferred embodiment, the purpose of the digital tracking bandpass filter 82 is to provide a narrow (high Q) bandpass response with a center frequency determined by the RPM of a selected tachometer input. The center frequency may also be a selected integer multiple of the tachometer RPM. When a waveform passes through this filter, only vibration components corresponding to multiples of the turning speed of the monitored machine will remain. When the RMS, peak, or peak-to-peak scalar value of the resultant waveform is calculated by the corresponding FPGA calculation block (88, 90 or 92), the result is same as a value that would be returned by an "nX peak" calculation performed in the application firmware of the LGC 16. Because this scalar calculation is performed as a continuous process in the FPGA 36 rather than as a calculation done in firmware, it is better suited to be a "shutdown parameter" as compared to a corresponding value produced at a lower rate in firmware. One application of this measurement is in monitoring aero-derivative turbines, which generally require a tracking filter function for monitoring.

For several of the scalar overall values, the individual data type from which the values are calculated may be selected from the input data stream, the single-integrated data stream, the double-integrated data stream, the high-pass filtered (DC blocked) data stream, or the tracking filter data stream based on the positions of the switches 84a-84d. Also, several of the scalar overall channels have an individually-programmable low-pass filter 88a-88d. In the preferred embodiment, these scalar overall values are generated independently of and in parallel to the time waveforms that are used for prediction or protection. The scalar overall measurement calculation blocks preferably include:

an RMS block 88 that determine the RMS value of the time waveform, where the RMS integration time may preferably be set to 0.01 s, 0.1 s, 1 s, or 10 s;

a peak block 90 that determines the greater of the positive or negative waveform peak value relative to the average value of the waveform, which is preferably measured over a period determined by either the tachometer period or a programmable time delay;

a peak-peak block 92 that determines the waveform peak-to-peak value over a period determined by either the tachometer period or a programmable time delay;

an absolute +/− peak block 94 that determines the value of the most positive signal waveform excursion and the value of the most negative signal waveform excursion relative to the zero point of the measurement range, which is preferably measured over a period determined by either the tachometer period or a programmable time delay;

a DC block 96 that determines the DC value of the time waveform, which has a measurement range preferably set to 0.01 Hz, 0.1 Hz, 1 Hz, or 10 Hz; and a PeakVue' block 100 that determines a scalar value representing the peak value of the filtered and full-wave-rectified PeakVue™ waveform as described in U.S. Pat. No. 5,895,857 to Robinson et al. (incorporated herein by reference), which is preferably measured over a period determined by either the tachometer period or a programmable time delay. Full wave rectification and peak hold functions are implemented in the functional block 98. The PeakVue™ waveform from the block 98 is also made available as a selectable input to the prediction time waveform and protection time waveform processing described herein.

The prediction time waveform processing section 116 of the FPGA 36 provides a continuous, filtered time waveform for use by any prediction monitoring functions. An independent lowpass filter/decimator 104a is provided so that the prediction time waveform may be a different bandwidth than the protection time waveform. A waveform up-sampling block 106 provides data rate multiplication for analysis types such as Time Synchronous Averaging (TSA) or Order Tracking Input to the prediction time waveform processing section 116 may be selected from the input data stream, the single-integrated data stream, the double-integrated data stream, the high-pass filtered (DC blocked) data stream, or the PeakVue™ data stream based on the positions of the switch 102a.

The protection time waveform section 118 of the FPGA 36 provides a continuous, filtered time waveform for use by protection monitoring functions. An independent low pass filter/decimator 104b is provided so that the protection time waveform may be a different bandwidth than the prediction time waveform. Input to the protection time waveform processing section 118 may be selected from the input data stream, the single-integrated data stream, the double-integrated data stream, the high-pass filtered (DC blocked) data stream, or the PeakVue™ data stream based on the positions of the switch 102b.

Preferred embodiments provide for transient data collection, wherein continuous, parallel time waveforms from each signal processing channel may be collected for transmission to external data storage. Transient waveforms are preferably fixed in bandwidth and are collected from the protection time waveform data stream.

As shown in FIG. 1, the scalar overall values, as well as the digitally filtered time waveforms, pass through the LGC interface 38 to the LGC logic board 16 for further processing and transportation to the DCS controller 19 via the DCS I/O backplane 18 or to external software applications running on the MHM data analysis computer 54 via the Ethernet port 52.

Figure 3:
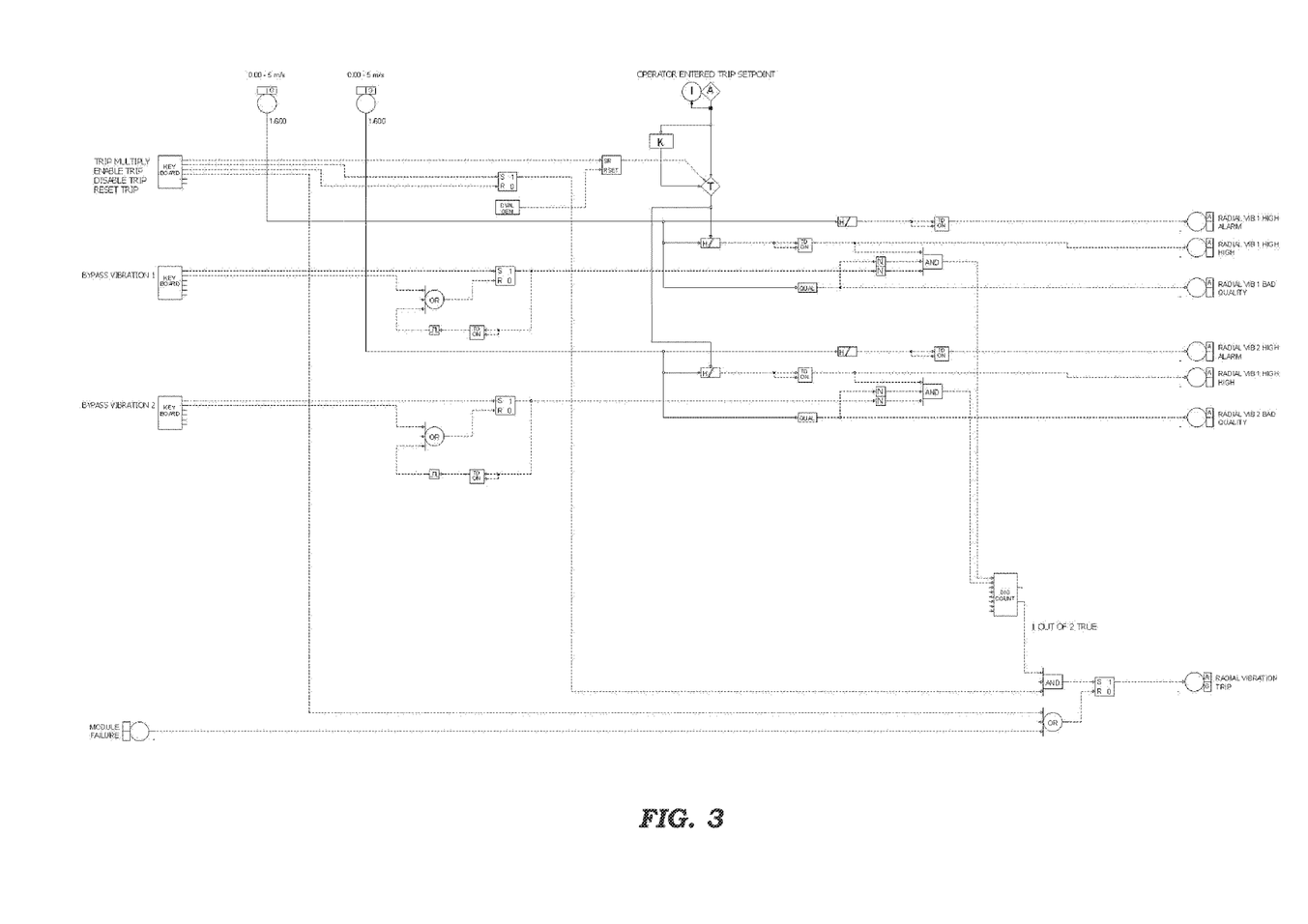
FIG. 3 depicts an example of control logic executed by a DCS controller according to an embodiment of the invention.

FIG. 3 depicts an example of a control logic routine (also referred to herein as a control sheet) that is performed by the DCS controller 19. In preferred embodiments, a control sheet is scheduled to execute at a predetermined rate, such as 1 sec, 0.1 sec, or 0.01 sec, by the DCS software running in the controller 19. As the control sheet that controls the vibration process is executed, scalar overall vibration values are scanned from the DCS I/O bus 18 and output values are generated at the execution rate of the control sheet.

Logic functions performed by the control sheets preferably include:

Voting logic, such as logic to determine that an alert condition exists if 2 out of 2 scalar values are over threshold, or 2 out of 3 are over threshold.

Combining vibration data with other DCS process parameter data (such as pressure and temperature).

Trip multiply, which is a temporary condition determined by current machine state or by manual input that increases an alarm level. Trip multiply is typically used during the startup of a rotational machine, such as a turbine. As the turbine speeds up, it normally passes through at least one mechanical resonance frequency. Since higher than normal vibration conditions are measured during this resonance, "trip multiply" is used to temporarily raise some or all of the alarm levels to avoid a false alarm trip. The trip multiply input may be set manually with operator input, or automatically based on RPM or some other "machine state" input.

Trip bypass, which is typically a manual input to suppress operation of the output logic to disable trip functions, such as during machine startup. Trip bypass is a function that suppresses either all generated vibration alarms, or any outputs that would be used as a trip control, or both. The trip bypass input may be set manually with operator input, or automatically based on some "machine state" input.

Time delay, which is a delay that is normally programmed to ensure that trip conditions have persisted for a specified time before allowing a machine trip to occur. Trip time delays are normally set to between 1 and 3 seconds as recommended by API670. The purpose of this delay is to reject false alarms caused by mechanical or electrical spikes or glitches.

Figure 4:
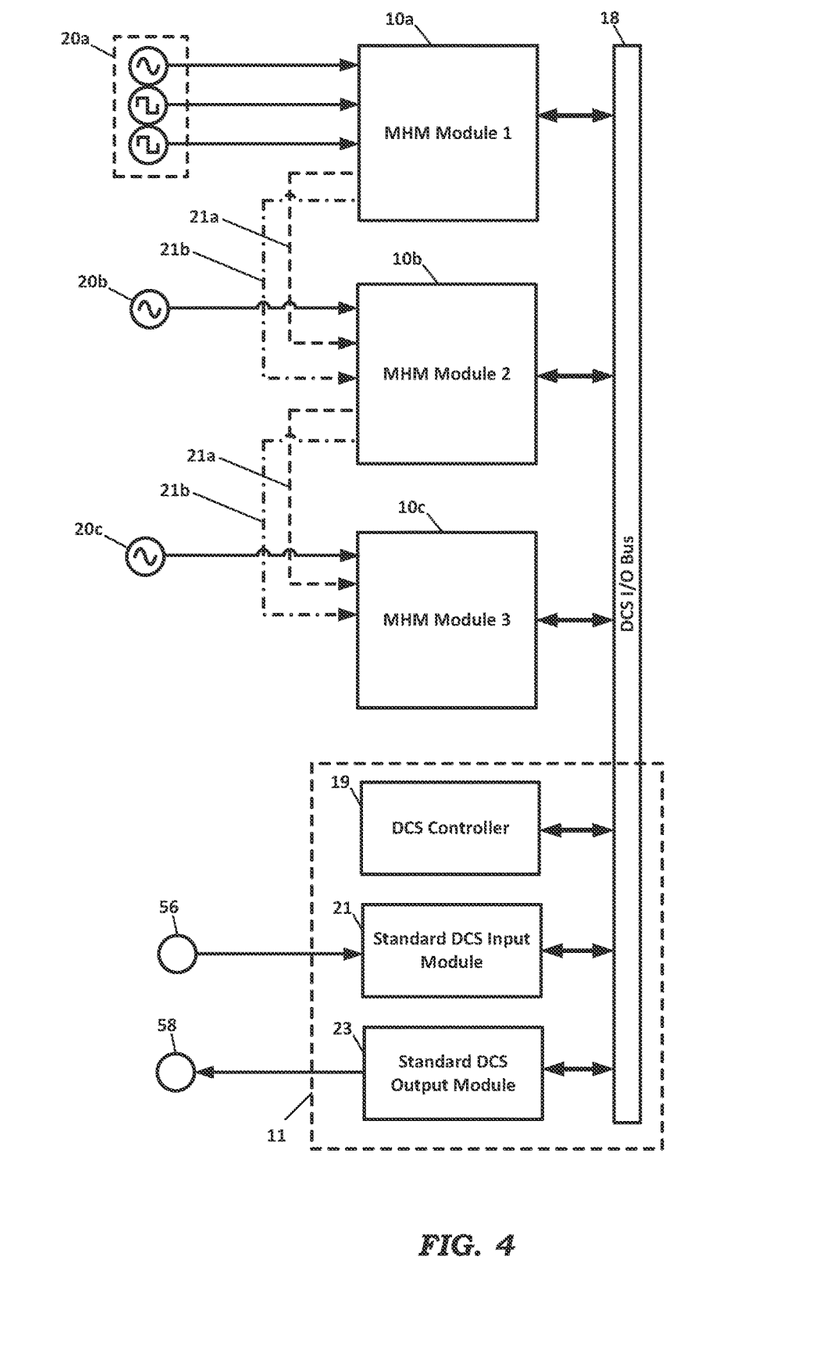
FIG. 4 depicts multiple MHM modules and two tachometer channels interfaced with a DCS according to an embodiment of the invention.
Figure 5A:
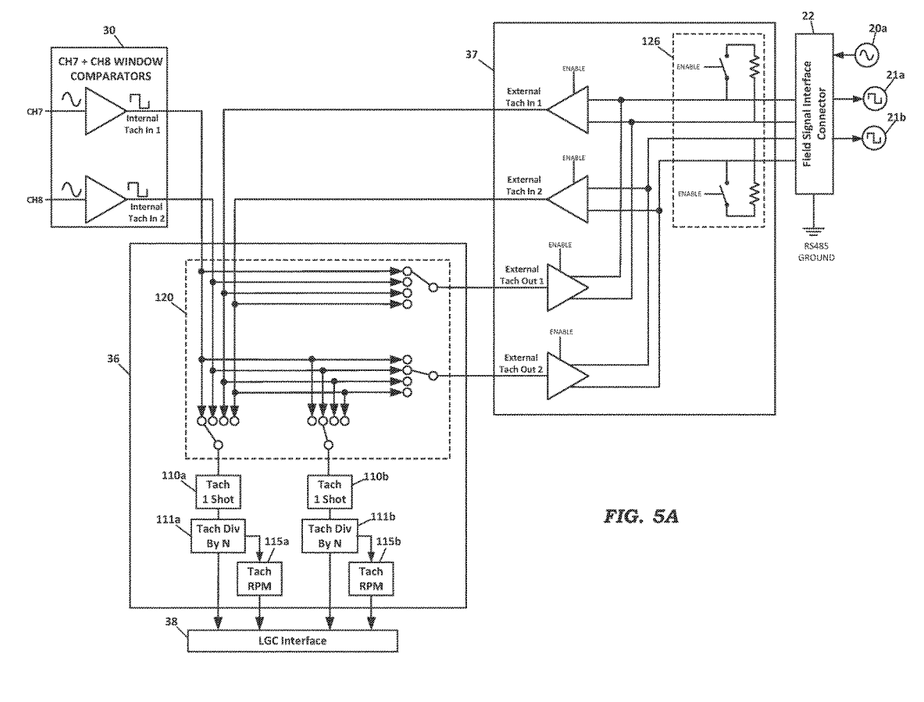
FIGS. 5A and 5B depict a tachometer channel distribution circuitry according to an embodiment of the invention.
Figure 5B:
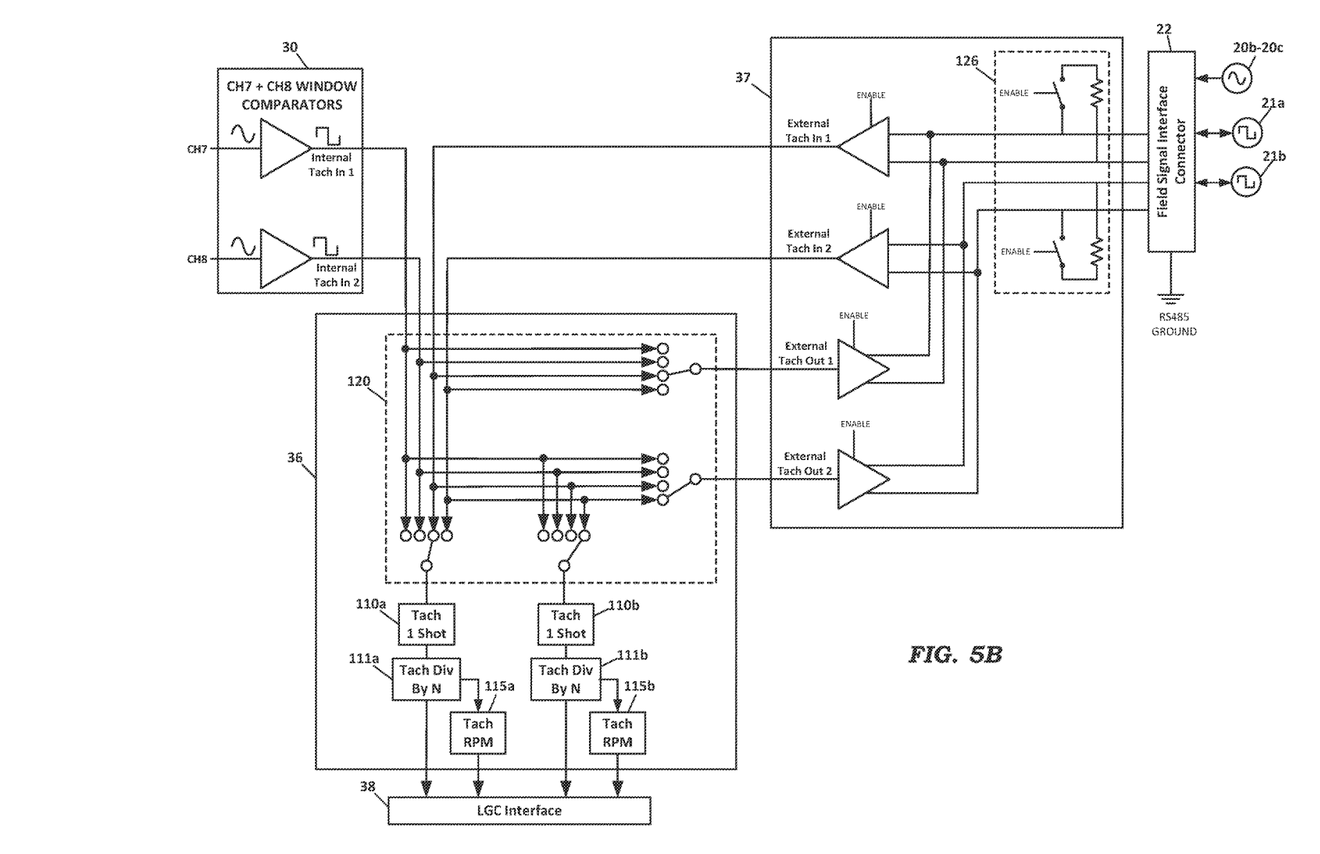

In many vibration measurement applications, such as in large steam turbines and other complex machines, one or two tachometers signals may be needed for use by several MHM modules. FIGS. 4, 5A and 5B depict an embodiment in which three MHM modules 10a, 10b and 10c are interfaced with a DCS 11 and share two tachometer channels. This allows the individual modules 10a-10c to use the same tachometer pulse information without having to "bridge" a single tachometer sensor across multiple modules.

With reference to FIG. 4, two tachometer signals are included in the sensor signals generated by the group of sensors 20a. In an exemplary embodiment described herein, the tachometer signals comprise two of eight sensor signals provided to the field signal interface connector 22 (FIG. 1). As described in more detail below, the MHM module 10a derives two tachometer trigger signals from the two tachometer sensor signals and distributes them as tachometer trigger signals 21a and 21b to MHM module 10b, and MHM module 10b distributes them to MHM module 10c.

As shown in the preferred embodiments of FIGS. 5A and 5B, a cross-point switching mechanism 120 is implemented in the signal processing FPGA 36 in the field digital FPGA signal processing card 14 (FIG. 1). The cross-point switch 120 provides several tachometer signal distribution options:

(1) routing the internally-triggered tachometer signals from the tachometer trigger 30 to the appropriate tachometer processing circuitry (110a-111a-115a or 110b-111b-115b) in the FPGA 36 (as shown in FIG. 5A);

(2) routing the internally-triggered tachometer signals from the tachometer trigger 30 to the field signal interface connector 22 to be used as external tachometer outputs 21a-21b (also shown in FIG. 5A);

(3) routing external tachometer input signals 21a-21b from the field signal interface connector 22 to the appropriate tachometer processing circuitry (110a-111a-115a or 110b-111b-115b) in the FPGA 36 (as shown in FIG. 5B); and (4) routing external tachometer input signals 21a-21b from the field signal interface connector 22 back to the connector 22 to be used as external tachometer outputs 21a-21b for use by another MHM module (as also shown in FIG. 5B).

In the example depicted in FIG. 4, the cross-point switch 120 in the MHM module 10a implements option (1) to route its internally-generated tachometer trigger signals to the appropriate tachometer processing circuitry (110a-111a-115a or 110b-111b-115b) in the MHM module 10a. The cross-point switch 120 in the MHM module 10a also implements option (2) to route its internally-generated tachometer trigger signals to the MHM module 10b. The cross-point switch 120 in the MHM module 10b implements option (3) to route the external tachometer signals from the MHM module 10a to the appropriate tachometer processing circuitry (110a-111a-115a or 110b-111b-115b) in the MHM module 10b. The cross-point switch 120 in the MHM module 10b also implements option (3) to route the external tachometer signals from the MHM module 10a to the MHM module 10c. The cross-point switch 120 in the MHM module 10c implements option (3) to route the external tachometer signals from the MHM module 10b to the appropriate tachometer processing circuitry (110a-111a-115a or 110b-111b-115b) in the MHM module 10c.

As shown in FIGS. 1, 5A and 5B, the external tachometer pulse waveforms are transmitted to the connector 22 via electrically-isolated differential drivers in an external tachometer trigger circuit 37. The circuit 37 also includes programmable terminators 126 so that a variety of wiring configurations may be properly terminated.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A field programmable gate array (FPGA) for processing machine vibration data, the FPGA comprising:
    interface circuitry configured to receive a synchronous serial digital data stream comprising a plurality of multiplexed data channels, one or more of which contain machine vibration data derived from machine vibration sensors and one or more of which contain tachometer data derived from tachometer sensors, and configured to de-multiplex the serial digital data stream into a plurality of separate input data streams corresponding to the multiplexed data channels, wherein a plurality of the separate input data streams contain machine vibration data and at least one of the separate input data streams contains tachometer data;
    tachometer data processing circuitry configured to receive one or more of the separate input data streams that contain tachometer data and to process the tachometer data to generate one or more values indicative of a rotational speed;
    vibration data processing circuitry comprising a plurality of parallel signal processing channels corresponding to the plurality of separate input data streams containing machine vibration data, wherein one or more of the parallel signal processing channels include:
        a high pass filter configured to receive one of the input data streams containing machine vibration data and to remove signal components having frequencies below a DC blocking threshold frequency, thereby generating a high pass filtered data stream;
        a first integration circuit configured to receive and perform a first integration process on the input data stream or the high pass filtered data stream, thereby generating a first integrated data stream;
        a second integration circuit configured to receive and perform a second integration process on the first integrated channel data stream, thereby generating a second integrated data stream;
        a digital tracking bandpass filter configured to receive and filter the input data stream, the first integrated data stream, or the second integrated data stream, thereby generating a bandpass filtered data stream, wherein a center frequency of the digital tracking bandpass filter is determined at least in part based on the one or more values generated by the tachometer data processing circuitry that are indicative of rotational speed; and
        a plurality of parallel calculation channels, each including:
            a data selection switch for selecting between one or more of the bandpass filtered data stream, the high pass filtered data stream, the first integrated data stream, the second integrated data stream, and the input data stream;
            a programmable lowpass filter circuit for receiving a selected data stream from the data selection switch and generating a lowpass filtered data stream based on the selected data stream; and
            a scalar value calculation circuit configured to receive the lowpass filtered data stream and calculate a scalar data value based thereon.

2. The FPGA of claim 1 further comprising:
an integrator input selection switch configured to receive and select between the input data stream and the high pass filtered data stream,
wherein the first integration circuit is configured to receive and integrate either the input data stream or the high pass filtered data stream based on the selection made by the integrator input selection switch.

3. The FPGA of claim 1 further comprising:
a tracking filter input selection switch configured to receive and select between the input data stream, the first integrated data stream, and the second integrated data stream,
wherein the digital tracking bandpass filter is configured to receive and filter either the input data stream, the first integrated data stream, or the second integrated data stream based on the selection made by the tracking filter input selection switch.

4. The FPGA of claim 1 wherein each of the scalar value calculation circuits is selected from the group consisting of an RMS scalar value calculation circuit, a peak scalar value calculation circuit, a peak-to-peak scalar value calculation circuit, and an absolute +/− peak scalar value calculation circuit.

5. The FPGA of claim 1 wherein one or more of the parallel signal processing channels of the vibration data processing circuitry include a PeakVue processing channel, comprising:
- a full-wave rectifier circuit for receiving and full-wave-rectifying the input data stream;
- a peak hold circuit for generating a peak hold waveform comprising peak levels of the full-wave-rectified input data stream; and
- a PeakVue scalar calculation circuit for calculating a scalar value representing a peak value measured over a predetermined time or a predetermined number of data samples in the peak hold waveform.

6. The FPGA of claim 5 wherein one or more of the parallel signal processing channels of the vibration data processing circuitry include a prediction time waveform processing channel, comprising:
- a data selection switch for selecting between one or more of the high pass filtered data stream, the first integrated data stream, the second integrated data stream, the input data stream, and the full-wave-rectified input data stream;
- a decimator circuit for receiving a selected data stream from the data selection switch and generating a decimated data stream based on the selected data stream; and
- an up-sampling circuit configured to up-sample the decimated data stream to generate an up-sampled data stream having a data rate that is greater than a data rate of the selected data stream.

7. The FPGA of claim 5 wherein one or more of the parallel signal processing channels of the vibration data processing circuitry include a protection time waveform processing channel comprising:
- a data selection switch for selecting between one or more of the high pass filtered data stream, the first integrated data stream, the second integrated data stream, the input data stream, and the full-wave-rectified input data stream; and
- a decimator circuit for receiving a selected data stream from the data selection switch and generating a decimated data stream based on the selected data stream.

8. The FPGA of claim 1 wherein the tachometer data processing circuitry further comprises a programmable trigger noise rejection circuit for reducing excessive jitter or noise in the one or more separate input data streams that contain tachometer signal data.

9. The FPGA of claim 1 wherein the tachometer data processing circuitry further comprises a divide-by-N circuit comprising a programmable pulse divider that divides pulse rates by an integer value N in the one or more separate input data streams that contain tachometer data.

10. The FPGA of claim 1 wherein the tachometer data processing circuitry further comprises an RPM indicator circuit that determines the RPM of a tachometer pulse stream in the tachometer data and generates an RPM scalar value based thereon.

11. The FPGA of claim 10 wherein the tachometer data processing circuitry further comprises a zero-speed detection circuit that provides a zero-speed indication when the RPM is at or below a predetermined threshold for at least a predetermined interval.

12. The FPGA of claim 10 wherein the tachometer data processing circuitry further comprises an over-speed detection circuit that provides an over-speed indication when the RPM is at or above a predetermined threshold for at least a predetermined interval.

13. The FPGA of claim 10 wherein the digital tracking bandpass filter is configured to receive the RPM scalar value and determine the center frequency of the digital tracking bandpass filter based at least in part on the RPM scalar value.

14. The FPGA of claim 1 wherein the tachometer data processing circuitry further comprises a rotation direction detection circuit that determines a direction of machine component rotation based on comparing phases of tachometer pulse signals in two of the separate input data streams that contain tachometer data.

15. The FPGA of claim 1 wherein the one or more separate input data streams that contain tachometer signal data include a first tachometer input signal data stream and a second tachometer input signal data stream, the FPGA further comprising:
- the tachometer data processing circuitry including parallel first and second tachometer data processing channels; and
- a cross-point switching circuit configured to receive the first and second tachometer input signal data streams, to direct the first tachometer input signal data stream to either or both of the first and second tachometer data processing channels, and to direct the second tachometer input signal data stream to either or both of the first and second tachometer data processing channels.

16. The FPGA of claim 15 wherein the cross-point switching circuit is further configured to direct either of the first and second tachometer input signal data streams to a first external tachometer signal output.

17. The FPGA of claim 16 wherein the cross-point switching circuit is further configured to direct either of the first and second tachometer input signal data streams to a second external tachometer signal output.

18. The FPGA of claim 15 wherein the cross-point switching circuit is further configured to receive a first external tachometer input signal and direct the first external tachometer input signal to either or both of the first and second tachometer data processing channels.

19. The FPGA of claim 18 wherein the cross-point switching circuit is further configured to receive a second external tachometer input signal and direct the second external tachometer input signal to either or both of the first and second tachometer data processing channels.

20. The FPGA of claim 15 wherein the cross-point switching circuit is further configured to receive one or more external tachometer input signals and direct the one or more external tachometer input signals to one or more external tachometer signal outputs.

21. A machinery health monitoring module that processes machine vibration data signals and provides the machine vibration data to a distributed control system, the machinery health monitoring module comprising:
- signal conditioning circuitry having an interface for receiving a plurality of analog vibration signals from a plurality of vibration sensors and for receiving first and second analog tachometer signals from first and second tachometer sensors, amplification and filter circuitry for conditioning the plurality of analog vibration signals and the first and second analog tachometer signals, and analog-to-digital conversion circuitry for converting the plurality of analog vibration signals and the first and second analog tachometer signals into a plurality of digital vibration signals and first and second digital tachometer signals;

processing circuitry in electrical communication with the signal conditioning circuitry, the processing circuitry comprising:
- a plurality of parallel vibration signal processing channels that are each configured to process a corresponding one of the plurality of digital vibration signals to generate multiple scalar vibration values per channel and at least one vibration time waveform per channel;
- first and second tachometer data processing channels that are each configured to process a corresponding one of the first and second digital tachometer signals to generate one or more values per channel that are indicative of rotational speed; and
- a cross-point switching circuit configured to receive the first and second digital tachometer signals, to direct the first digital tachometer signal to either or both of the first and second tachometer data processing channels, and to direct the second tachometer signal to either or both of the first and second tachometer signal processing channels.

22. The machinery health monitoring module of claim 21 wherein the cross-point switching circuit is further configured to direct either of the first and second digital tachometer signals to a first external tachometer signal output.

23. The machinery health monitoring module of claim 22 wherein the cross-point switching circuit is further configured to direct either of the first and second digital tachometer signals to a second external tachometer signal output.

24. The machinery health monitoring module of claim 21 wherein the cross-point switching circuit is further configured to receive a first external tachometer input signal and direct the first external tachometer input signal to either or both of the first and second tachometer data processing channels.

25. The machinery health monitoring module of claim 24 wherein the cross-point switching circuit is further configured to receive a second external tachometer input signal and direct the second external tachometer input signal to either or both of the first and second tachometer data processing channels.

26. The machinery health monitoring module of claim 21 wherein the cross-point switching circuit is further configured to receive one or more external tachometer input signals and direct the one or more external tachometer input signals to one or more external tachometer signal outputs.

* * * * *